(12) United States Patent
Hong et al.

(10) Patent No.: US 9,818,167 B2
(45) Date of Patent: Nov. 14, 2017

(54) MULTI-GRID METHOD AND APPARATUS USING V CYCLE

(71) Applicant: Dongguk University Industry Academic Cooperation Foundation, Seoul (KR)

(72) Inventors: Jeong Mo Hong, Seoul (KR); Hwi Ryong Jung, Gumi-si (KR); Sun Tae Kim, Seoul (KR)

(73) Assignee: Dongguk University Industry Academic Cooperation Foundation, Seoul (KR)

( * ) Notice: Subject to any disclaimer, the term of this patent is extended or adjusted under 35 U.S.C. 154(b) by 207 days.

(21) Appl. No.: 14/846,069

(22) Filed: Sep. 4, 2015

(65) Prior Publication Data

US 2015/0379691 A1    Dec. 31, 2015

Related U.S. Application Data

(63) Continuation of application No. PCT/KR2013/007401, filed on Aug. 16, 2013.

(30) Foreign Application Priority Data

Mar. 4, 2013 (KR) .................. 10 2013 0023039
May 3, 2013 (KR) .................. 10 2013 0050295

(51) Int. Cl.
*G06T 1/20* (2006.01)
*G06F 17/13* (2006.01)
(Continued)

(52) U.S. Cl.
CPC ............. *G06T 1/20* (2013.01); *G06F 17/13* (2013.01); *G06T 5/002* (2013.01); *G06T 5/20* (2013.01); *G06T 13/60* (2013.01); *G06T 2210/24* (2013.01)

(58) Field of Classification Search
CPC ........................................... G06F 17/13
See application file for complete search history.

(56) References Cited

U.S. PATENT DOCUMENTS

2007/0047810 A1    3/2007   Grady
2008/0298653 A1*  12/2008   Amunts ............... G06T 3/0093
                                                 382/128
2014/0219579 A1*   8/2014   Lischinski ........... G06F 17/15
                                                 382/279

FOREIGN PATENT DOCUMENTS

JP    2006293488 A    10/2006
JP    2008197921 A     8/2008
(Continued)

OTHER PUBLICATIONS

English translation of PCT Search Report dated Dec. 26, 2013, received in corresponding PCT Application No. PCT/KR2013/007401, 2 pgs.
(Continued)

*Primary Examiner* — Kee M Tung
*Assistant Examiner* — Grace Q Li
(74) *Attorney, Agent, or Firm* — Grossman Tucker Perreault & Pfleger, PLLC

(57) ABSTRACT

A multi-grid method using a V cycle includes: obtaining a first intermediate solution and a first residual by smoothing a cell of a fine level; obtaining a cell of a coarse level by down-sampling the cell of the fine level and setting the first residual as a second residual of the cell of the coarse level; obtaining a high-frequency component solution of the cell of the fine level and obtaining a smoothed high-frequency component solution by smoothing the high-frequency component solution; obtaining a coarse solution in the cell of the coarse level; up-sampling and transferring the coarse solution to the cell of the fine level and obtaining a corrected intermediate solution by adding the first intermediate solu-
(Continued)

tion, the smoothed high-frequency component solution and the coarse solution; and obtaining a second intermediate solution by smoothing the corrected intermediate solution.

14 Claims, 3 Drawing Sheets

(51) Int. Cl.
*G06T 13/60* (2011.01)
*G06T 5/20* (2006.01)
*G06T 5/00* (2006.01)

(56) References Cited

FOREIGN PATENT DOCUMENTS

| KR | 1020100088081 A | 8/2010 |
| KR | 1020120051865 A | 5/2012 |

OTHER PUBLICATIONS

English translation of PCT International Preliminary Report on Patentability and Written Opinion dated Sep. 8, 2015, received in corresponding PCT Application No. PCT/KR2013/007401, 7 pgs.

\* cited by examiner

MULTI-GRID METHOD AND APPARATUS USING V CYCLE

CROSS REFERENCE TO RELATED APPLICATIONS

This application is a continuation of PCT/KR2013/007401 filed Aug. 16, 2013, which claims the benefit of Korean Patent Application No. 10-2013-0023039 filed Mar. 4, 2013 and Korean Patent Application No. 10-2013-0050295 filed May 3, 2013, the disclosures of which are incorporated herein by reference in its entirety.

BACKGROUND

1. Technical Field

The present invention relates to a computer graphics technology, more specifically to multi-grid apparatus and method using a V cycle.

2. Background Art

Today's computer graphics (CG) technology has been widely utilized in various fields, including movies, animation and advertisement, with a proportionally increasing importance. Particularly, rendering fluids, such as water, fire, etc., which are major CG-utilized special effects, is a significant portion in the production of visual works.

The CG technology related to the rendering of fluids is mainly realized through scene representation, simulation, reconstruction and rendering processes.

The scene representation process is for reconstructing a fluid, which is an object of simulation, as well as an external object interacting with the fluid to forms that are appropriate for simulation.

While it is imperative that the interacting object be rendered in a grid form as well in order to perform the simulation at a location of uniform grid, the initial conditions or boundary conditions, which are configured prior to the simulation, are configured during the scene representation process.

The scene representation process is also for configuring the initial conditions or boundary conditions of the simulation which renders the interacting object in a grid form.

The simulation process is for calculating the movement of the fluid with an equation such as the Navier-Stokes equation for describing a movement of the fluid or a random factor.

In the reconstruction process, an external appearance is calculated from a simulation result of the fluid, such as water, having and maintaining an external appearance, by calculating the external appearance from arbitrary points or updating the initially calculated external appearance.

In the rendering process, a final image is created from a relation between light and the fluid configured in the form of a point, a face or an arbitrary function.

Among the processes described above, the simulation process takes up the most amount of time because a very large amount of calculation needs to be carried out in the simulation process.

The simulation process of a fluid involves obtaining a solution of the Poisson equation. Mainly used for obtaining the solution of the Poisson equation is the conjugate gradient method, the preconditioned conjugate gradient method or the multi-grid method.

The multi-grid method has a fast calculation speed and has a relatively small amount of calculation time increased, compared to the other methods, despite an increased resolution of the simulation. Particularly, the multi-grid method using a V cycle is most popularly used for simulating a fluid.

The processes of the conventional multi-grid method using a V cycle are divided into and processed by the plurality of processors. Accordingly, the conventional multi-grid method using a V cycle is not a truly parallel processing method, in which the plurality of processors should be simultaneously used, and still requires an excessive calculation time to obtain a solution of a specific accuracy, thereby making it difficult to render the fluid realistically.

SUMMARY

The present invention provides multi-grid method and apparatus for obtaining an accurate solution without an increase of time required for calculation.

The present invention also provides multi-grid method and apparatus that can render a more realistic fluid without an increase of required time by using a plurality of processors simultaneously.

An aspect of the present invention provides a multi-grid method using a V cycle. The multi-grid method using a V cycle in accordance with an embodiment of the present invention includes: a pre-smoothing step for obtaining a first intermediate solution and a first residual by smoothing a cell of a fine level; a restriction step for obtaining a cell of a coarse level by down-sampling the cell of the fine level and setting the first residual as a second residual of the cell of the coarse level; a middle smoothing step for obtaining a high-frequency component solution of the cell of the fine level and obtaining a smoothed high-frequency component solution by smoothing the high-frequency component solution; an operating step for obtaining a coarse solution in the cell of the coarse level; a prolongation step for up-sampling and transferring the coarse solution to the cell of the fine level and obtaining a corrected intermediate solution by adding the first intermediate solution, the smoothed high-frequency component solution and the coarse solution; and a post-smoothing step for obtaining a second intermediate solution by smoothing the corrected intermediate solution.

The pre-smoothing step, the middle smoothing step, the post-smoothing step may have a Jacobi smoothing method or a Gauss-Sidel smoothing method applied thereto.

The pre-smoothing step, the restriction step, the middle smoothing step, the prolongation step and the post-smoothing step may be performed by a first processor, and the operating step may be performed by a second processor.

The middle smoothing step and the operating step may be performed simultaneously.

The restriction step may include: determining whether a cell targeted for restriction is a solid object cell; and if the cell targeted for restriction is a solid object cell, setting the cell targeted for restriction with an average value of fluid cells surrounding the cell targeted for restriction.

The prolongation step may include: determining whether a cell targeted for prolongation is a solid object cell; and if the cell targeted for prolongation is a solid object cell, setting the cell targeted for prolongation with an average value of fluid cells surrounding the cell targeted for prolongation.

Another aspect of the present invention provides a computer-readable recording medium having a program for performing a multi-grid method using a V cycle in accordance with an embodiment of the present invention written therein.

Another aspect of the present invention provides a data processing apparatus comprising at least one processor configured for performing a multi-grid method using a V cycle in accordance with an embodiment of the present invention.

According to the multi-grid method using a V cycle in accordance with an embodiment of the present invention, a highly accurate solution may be obtained without an increase in calculation time in a simulation process by the multi-grid method, and a more realistic fluid rendering is possible when the method is applied to a fluid rendering CG technology.

Moreover, a parallel processing of the multi-grid method is possible using a plurality of processors simultaneously, and a solution with a higher accuracy may be obtained by considering a higher-frequency component while performing the multi-grid method.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain technology is determined to evade the point of the present invention, the pertinent detailed description will be omitted. Unless clearly used otherwise, expressions in a singular form include a meaning of a plural form.

Hereinafter, terms used in association with the present invention will be described in order to help understanding of the present invention.

Fluid animation used in movies or TV commercials may be realistically calculated through a process of solving a Navier-Stokes equation in an Eulerian grid. In the process of solving the Navier-Stokes equation in the Eulerian grid, the most calculation time is required in a projection process, which is performed for preserving the mass and volume of the fluid.

Mostly used for saving the calculation time of the projection process is a multi-grid method, which is a process of obtaining a solution of a Poisson equation. The multi-grid method is applied to improve the speed of calculation when the solution of the Poisson equation is obtained. A restriction operator and a prolongation operator are used for moving information required for solving the Poisson equation between grid levels. Moreover, a multi-grid conjugate gradient method is used for solving a linear system having a large number of eigenvalues.

Figure 1:
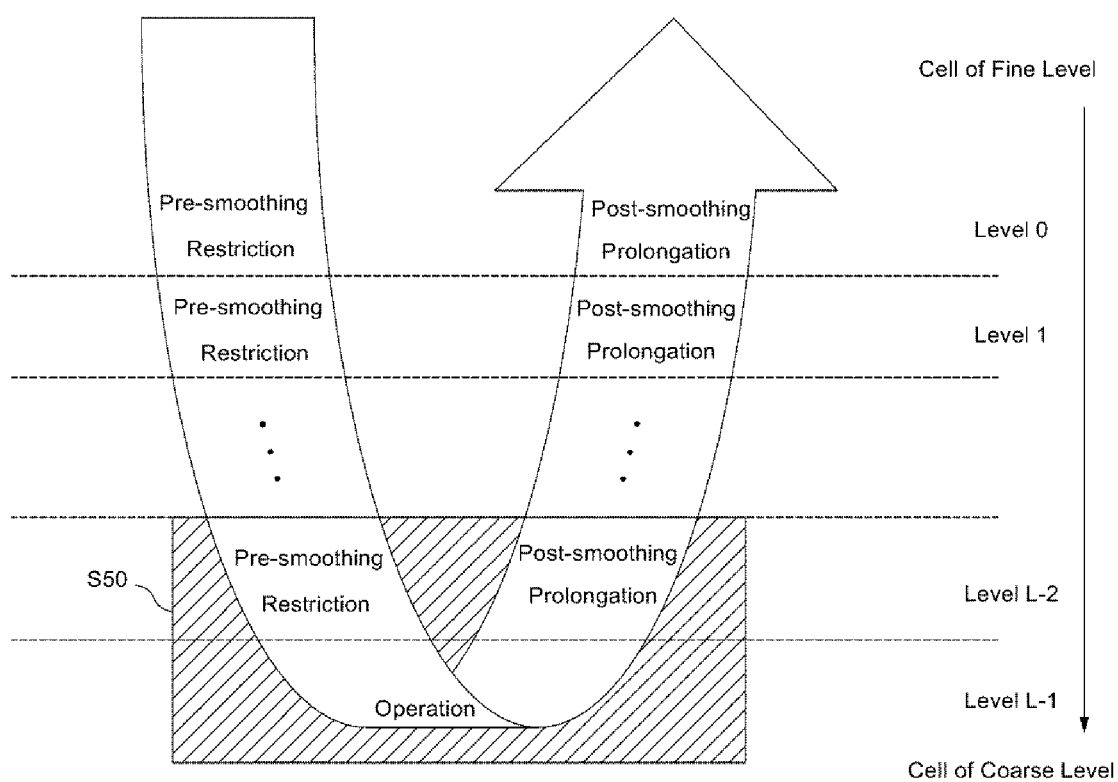
FIG. 1 is a brief illustration of processes used in a multi-grid method using a V cycle.

FIG. 1 is a brief illustration of processes used in a multi-grid method using a V cycle.

The multi-grid method uses smoothing, coarsening, restriction and prolongation operators.

While a layer structure of an overall system matrix is constructed prior to carrying out the multi-grid method, the coarsening operator is used to make a system in a fine level to a linear system in a coarse level. This process is repeated from the finest level to the coarsest level to generate the overall layer structure. The example in FIG. 1 illustrates a model having L levels (i.e., Level 0 to Level L−1) from the finest level to the coarsest level. Once the level structure of the linear system is constructed, the multi-grid method finds the solution by going up and down the levels of the layer structure.

The smoothing operator separates a high-frequency error (i.e., narrow area deformation) that is easily rendered in the finest level. By repeating the smoothing process several times, an immediate solution and a residual error of the linear system may be obtained in the finest level.

The restriction operator sub-samples the residual error and sets the sub-sampled residual error as a residual error on a next coarser level. The linear system of the coarsest level (i.e., Level L−1) that is obtained by repeatedly performing the restriction process up to the coarsest level is solved using a direct solver.

The prolongation operator interpolates a solution of the coarsest level (L−1) to correct an intermediate solution of a next finer level. The linear system is solved by taking the corrected solution as an initial prediction value of this level. Here, the smoothing operator is repeatedly applied to reduce an error of this initial prediction to approach the solution. The V cycle is completed when the finest level is reached by repeating the smoothing and prolongation processes.

Table 1 is an example of an algorithm for realizing the V cycle techniques.

TABLE 1

| Algorithm V-Cycle( ) |
| --- |
| 1: for l = 0 to L − 2 do |
| 2:   Smooth($A^l$, $x^l$, $b^l$) |
| 3:   $r^l \leftarrow b^l - A^l x^l$ |
| 4:   $b^{l+1} \leftarrow$ Restrict($r^l$) |
| 5:   $x^{l+1} \leftarrow 0$ |
| 6: end for |
| 7: Solve $A^{L-1} x^{L-1} = b^{L-1}$ accurately |
| 8: for l = L − 2 down to l = 0 do |
| 9:   $x^l \leftarrow x^l +$ Prolongate($x^{l+1}$) |
| 10:   Smooth($A^l$, $x^l$, $b^l$) |
| 11: end for |

Figure 2:
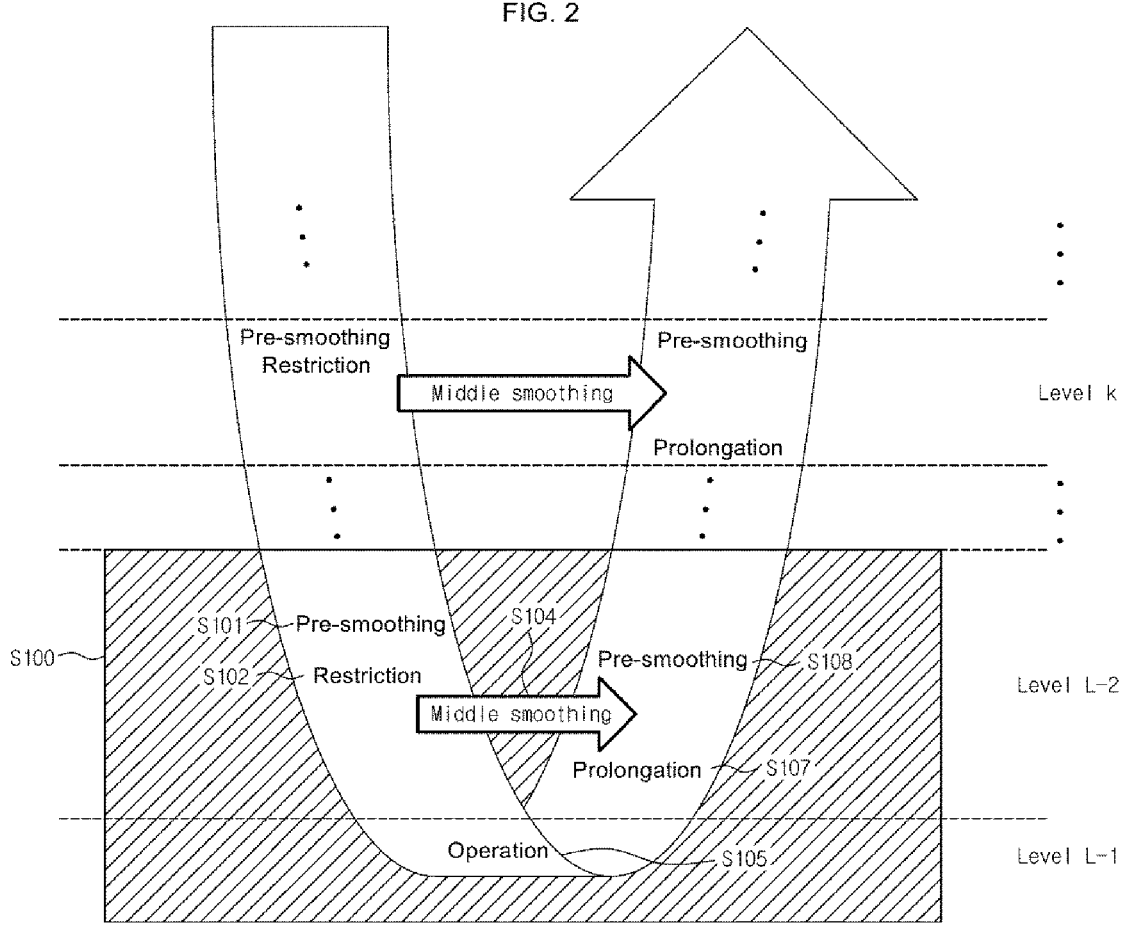
FIG. 2 shows a multi-grid method using a V cycle in accordance with an embodiment of the present invention.

FIG. 2 shows a multi-grid method using a V cycle in accordance with an embodiment of the present invention.

The multi-grid method using a V cycle that simulates an incompressible fluid in accordance with an embodiment of the present invention includes a pre-smoothing step S101, a restriction step S102, a middle smoothing step S104, an operating step S105, a prolongation step S107 and a post-smoothing step S108.

Hereinafter, differences from the V cycle shown in FIG. 1 will be mainly described. The V cycle in accordance with an embodiment of the present invention that corresponds to S50 shown in FIG. 1 is S100 shown in FIG. 2. The S100 process may be constituted with steps performed in a coarsest level L−1 and a previous level L−2. The V cycle in accordance with an embodiment of the present invention further includes the middle smoothing step S104. Hereinafter, a fine level and a coarse level are relative concepts, and for the convenience of description, Level L−1 will be taken as an example of the fine level, and Level L−2 will be taken as an example of the coarse level, but it is possible that Level t expressed as the fine level is any one of Level 0 to Level L−2 and that the level expressed as the coarse level is Level t+1.

In the pre-smoothing step S101 of the example shown in FIG. 2, a first intermediate solution and a first residual are obtained by smoothing a cell of the fine level (e.g., Level L−2). In other words, the pre-smoothing step S101 is a process of obtaining a solution in a cell of the fine level.

In an embodiment of the present invention, a Jacobi smoothing method or a Gauss-Sidel smoothing method may be applied to the process of obtaining the solution. The pre-smoothing step S101 allows an intermediate solution and a residual to be obtained in a cell of a fine level. Here, the intermediate solution refers to a solution that is close to a true value that can be obtained in an intermediate process of obtaining a final true value and may be different from the final true value. The residual refers to a value for compensating the difference between the intermediate solution and the true value.

In the restriction step S102, a cell of the coarse level is obtained by down sampling a cell of the fine level, and the first residual is set as a second residual of the coarse cell. Down sampling may involve taking a dead center value of the cell of the fine level and obtaining the cell of the coarse level by having the dead center value divided by the number of cells from which the dead center value is taken.

Figure 3:
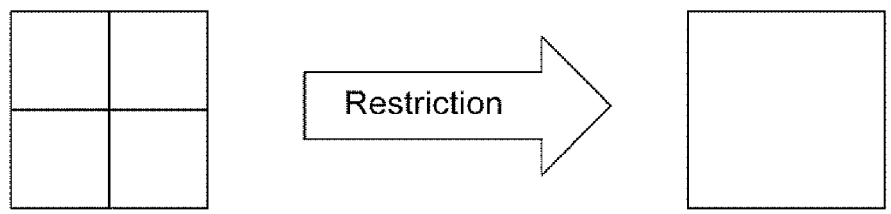
FIG. 3 illustrates a result when a cell of a fine level is restricted to a cell of a coarse level.

FIG. 3 illustrates a result when the cell of the fine level is restricted to the cell of the coarse level.

Assuming that the cell of the fine level contains 4 cells, 4 dead center values of the 4 cells may be obtained, respectively, and a single value of the cell of the coarse level may be set by dividing the obtained dead center values by 4. Moreover, the solution may be obtained in the coarse level by setting the first residual as a residual on the coarse level, that is, the second residual.

In the restriction step S102 of the V cycle in accordance with an embodiment of the present invention, for a solid object cell, which is not an empty cell among the non-fluid cells, an average of fluid cell values around the solid object cell may be obtained and set as a value of the pertinent solid object cell. As a result, an accuracy of a final solution of the solution may be further improved.

If a fluid cell located at a boundary between the fluid cell and a non-fluid cell were restricted, the value of the non-fluid cell would be taken into consideration when the value of the fluid cell is calculated during the restriction process, and thus the value of the fluid cell located at the boundary would have a lower value than the value at the original location. On the contrary, in the restriction step of the multi-grid method using a V cycle in accordance with an embodiment of the present invention, the average value of the surrounding fluid cells is filled in the non-fluid cell, and thus the value of the fluid cell tends to be reduced significantly less after performing the restriction, making it possible to obtain the solution of the fluid cell that is closer to the true value.

In the middle smoothing step S104, a high-frequency component solution is obtained by separating a high-frequency component in the cell of the fine level, and a smoothed high-frequency component solution is obtained by smoothing the high-frequency component solution.

The high-frequency component separated in the middle smoothing step S104 may be obtained from a difference between the cell of the fine level and the cell of the coarse level. While the cell of the fine level contains both a high-frequency component and a low-frequency component before the restriction step S102 is performed, the cell of the coarse level resulted from the restriction contains the low-frequency component only. Accordingly, the high-frequency component of the cell of the fine level may be obtained from the difference between the cell of the fine level and the cell of the coarse level.

Since the conventional V cycle has not considered the high-frequency component being dumped during the restriction process, the solution obtained through the V cycle has not been very accurate, or a relatively large amount of time has been required in order to obtain a solution having a certain level of accuracy. However, in the multi-grid method in accordance with an embodiment of the present invention, the high-frequency component, which has not been considered conventionally, is considered to enhance the accuracy of the obtained solution.

When the high-frequency component solution is obtained by smoothing the separated high-frequency component in the middle smoothing step S104, the high-frequency component solution may be obtained by applying the Jacobi smoothing technique or the Gauss-Sidel smoothing technique. By obtaining the high-frequency component solution through smoothing, the first intermediate solution may be interpolated to be closer to the true value.

The smoothed high-frequency component solution may be obtained by middle smoothing the high-frequency component solution in the middle smoothing step S104. In the multi-grid method using a V cycle in accordance with an embodiment of the present invention, the middle smoothing step S104 is added to the conventional V cycle to perform follow-up processes by adding the smoothed high-frequency component solution to the first intermediate solution, making it possible to obtain the solution that is closer to the true value.

In the operating step S105, a coarse solution is obtained in the cell of the coarse level by, for example, the conjugate gradient method, the preconditioned conjugate gradient method, etc.

As described above, the operating step S105 relatively takes the most amount of time in the entire processes of the multi-grid method. The operating step S105 in the conventional V cycle was generally processed by a CPU. Even when the multi-grid method using a V cycle was implemented by a plurality of processors, each processor handled a specific step. Accordingly, when any one processor was carrying out a specific step, other processors were in an idle state. Therefore, it was hardly possible to regard that the conventional multi-grid method had a truly parallel process at a time of handling a particular step.

The multi-grid method using a V cycle in accordance with an embodiment of the present invention uses a plurality of processors simultaneously to provide a truly parallel processing method for performing the multi-grid method. The steps of the multi-grid method using a V cycle in accordance with an embodiment of the present invention may be performed by at least one or more processors. Hereinafter, it will be described that the multi-grid method using a V cycle in accordance with an embodiment of the present invention is performed by a plurality of processors.

Although it will be assumed below, for the convenience of description, that the multi-grid method using a V cycle in accordance with an embodiment of the present invention is performed by 2 processors, it shall be appreciated that the multi-grid method using a V cycle in accordance with an embodiment of the present invention can by performed by 3 or more processors or through individual cores implemented in a single processor. In a more specific example, the two processors performing the multi-grid method using a V cycle in accordance with an embodiment of the present invention may be a CPU and a GPU. Hereinafter, the CPU and the GPU are merely specific examples of the processors performing a pertinent step, it shall be appreciated that various types of processors may be used, depending on the embodiment, without being restricted by their names.

While the operating step of the conventional multi-grid method using a V cycle was performed by the CPU, the operating step S105 of the multi-grid method using a V cycle in accordance with an embodiment of the present invention may be performed by the GPU. Despite its slow operating speed, the CPU contains a large memory and thus is advantageous for obtaining a solution of the cell of the fine level. On the contrary, despite a small memory, the GPU has a fast operating speed, making it advantageous for obtaining a solution of the cell of the coarse level.

For example, when the pre-smoothing step S101 and the restriction step S102 are performed by the CPU and the operating step S105 is performed by the GPU, the conventional multi-grid method keeps the CPU in an idle state when the GPU performs the operating step S105.

As described above, the multi-grid method using a V cycle in accordance with an embodiment of the present invention further includes the middle smoothing step S104 in order to obtain the final solution by considering the high-frequency component of the cell of the fine level that has not been considered in the conventional V cycle processes. In the multi-grid method in accordance with an embodiment of the present invention, the middle smoothing step S104 may be performed by the idle-state CPU while the GPU is obtaining the solution in the cell of the coarse level.

In the multi-grid method in accordance with an embodiment of the present invention, the CPU performs the middle smoothing step S104 and removes the idle state of the CPU while the GPU performs the operating step S105. In this sense, the multi-grid method in accordance with an embodiment of the present invention is truly a parallel processing method because the operating step S105 is performed by the GPU while the middle smoothing step S104 is performed by the CPU.

In the prolongation step S107, the coarse solution obtained through the operating step S105 is up-sampled and transferred to the cell of the fine level, and a corrected intermediate solution is obtained by adding the first intermediate solution, the smoothed high-frequency component solution and the coarse solution.

Figure 4:
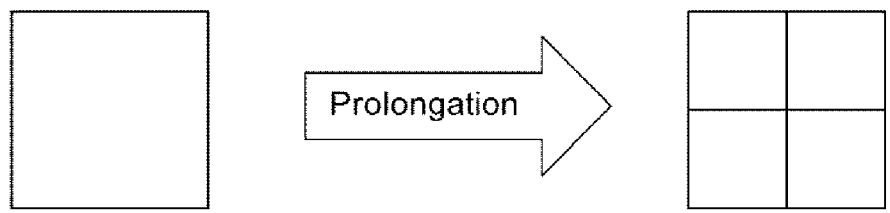
FIG. 4 illustrates a process of up-sampling a single cell to 4 cells in a prolongation step in accordance with an embodiment of the present invention.

FIG. 4 illustrates a process of up-sampling a single cell to 4 cells in the prolongation step S107 in accordance with an embodiment of the present invention. The cell of the fine level may be obtained by setting a solution of the single cell to a solution of the 4 cells through the up-sampling process. Moreover, the corrected intermediate solution that is closer to the true value may be obtained by adding the first intermediate solution obtained through the pre-smoothing step S101, the smoothed high-frequency component solution obtained through the middle smoothing step S104 and the coarse solution obtained through the operating step S105.

In the post-smoothing step S108, a second intermediate solution is obtained by smoothing the corrected intermediate solution obtained in the prolongation step S107. The Jacobi smoothing method or the Gauss-Sidel smoothing method may be applied to the post-smoothing step S108. The second intermediate solution may be obtained by post-smoothing the corrected intermediate solution, and the second intermediate solution processed through the post-smoothing step S108 may be even closer to the true value.

In the case where prolongation is performed for a fluid cell located at a boundary of fluid cells and non-fluid cells, the solution may be obtained by averaging the solution of the fluid cells and the solution of the non-fluid cells in the prolongation step S107 in accordance with an embodiment of the present invention.

Figure 5:
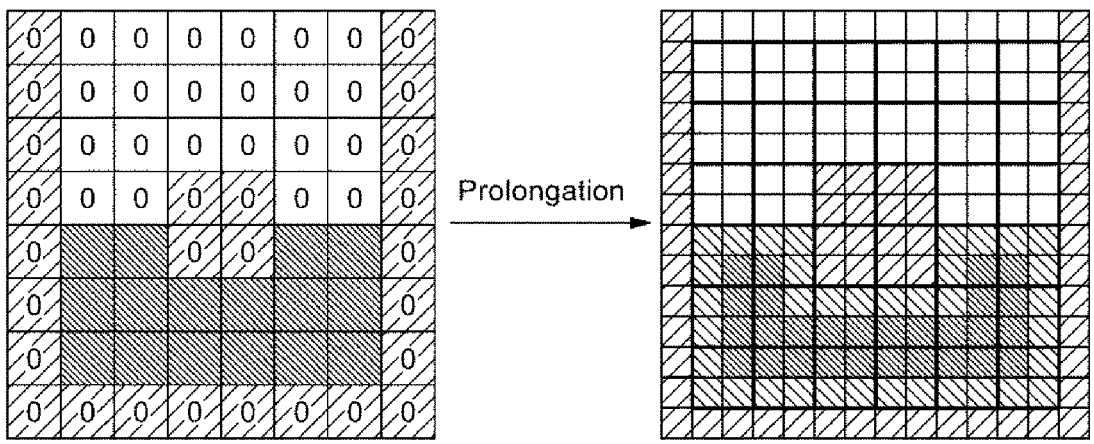
FIG. 5 shows an example of performing prolongation of fluid cells located at the boundary of the fluid cells and non-fluid cells.
Figure 6:
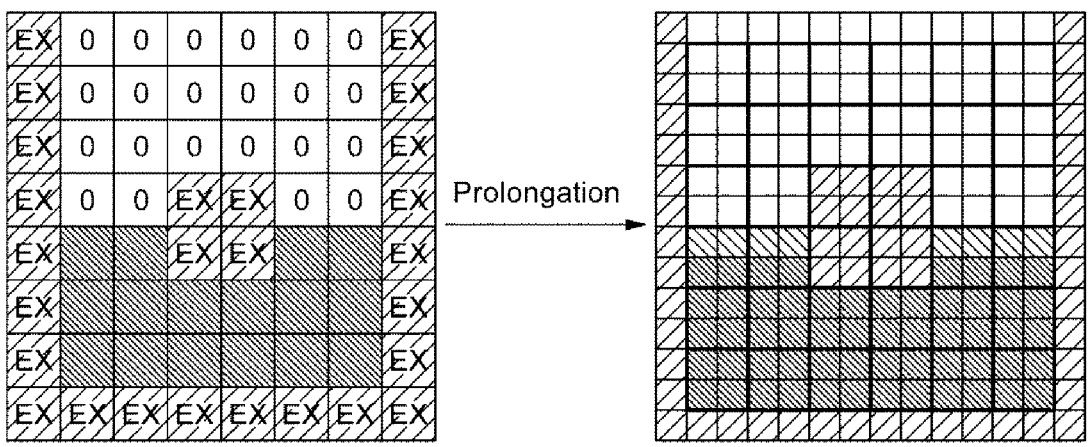
FIG. 6 shows an example of performing prolongation of fluid cells located at the boundary of the fluid cells and non-fluid cells in accordance with an embodiment of the present invention.

FIG. 5 shows an example of performing prolongation of fluid cells located at the boundary of the fluid cells and non-fluid cells, and FIG. 6 shows an example of performing prolongation of fluid cells located at the boundary of the fluid cells and non-fluid cells in accordance with an embodiment of the present invention.

Referring to FIG. 5, when prolongation is performed for a fluid cell located at the boundary of fluid cells and non-fluid cells, the value of a non-fluid cell is considered, allowing the fluid cell located at the boundary to have a lower value than an average value. Therefore, in the prolongation step S107 in accordance with an embodiment of the present invention, it is determined whether the cell targeted for prolongation is a solid object cell, which is not an empty cell among the cells that are not fluid cells, and the average value of surrounding fluid cells may be filled in for the solid object cell. The cells marked with "EX" in FIG. 6 are solid object cells, which are configured with the average value of their surround fluid cells.

As a result, the values of the fluid cells, not surrounding values, are reflected as much as possible in the restriction process of the fluid cells, the solution of the fluid cells by the boundary may be obtained to be even closer to the true value. Referring to FIG. 6, it can be inferred that the solution of the fluid cells located at the boundary of the fluid cells and the non-fluid cells obtained in FIG. 5 is reduced compared to the pre-prolongation value at the same locations.

Table 2 is an example of an algorithm for realizing the multi-grid method using a V cycle in accordance with an embodiment of the present invention.

As described above, the V cycle in accordance with an embodiment of the present invention has the middle smoothing process of obtaining the high-frequency component solution by processing the high-frequency component separated in the restriction process and reflecting the obtained high-frequency component solution in the post-smoothing process. Hereinafter, the V cycle in accordance with an embodiment of the present invention will be referred to as ∀ (Inverted A) cycle to be distinguished from the conventional V cycle.

TABLE 2

Algorithm Inverted A-Cycle( )

1: for l = 0 to L − 2 do
2:   Smooth($A^l$, $x^l$, $b^l$)
3:     $r^l \leftarrow b^l - A^l x^l$ TABLE 2-continued Algorithm Inverted A-Cycle( )

```
 4:     b^{l+1} ← Restrict(r^l)
 5:     r^l_{high} ← r^l − Prolongate(b^{l+1})
 6:     x^{l+1} ← 0
 7:     x^l_{high} ← 0
 8: end for
 9: Solve A^{L−1}x^{L−1} = b^{L−1} accurately on
    GPU
10: for l = 0 to L − 2 do
11:     Smooth(A^l, x^l_{high}, r^l_{high})  ▷ on CPU
12: end for
13: for l = L− 2 down to l = 0 do
14:     x^l ← x^l + x^l_{high} + Prolongate(x^{l+1})
15:     Smooth(A^l, x^l, b^l)
16: end for
```

The technical features of the ∀ cycle in accordance with an embodiment of the present invention distinguished from the conventional V cycle may be found on line 5, line 7, line 11 and line 14 of the algorithm shown in Table 2.

On line 1, "L" indicates the number of levels between the finest level and the coarsest level. For instance, in the case where there are L levels, smoothing and restriction may be performed L−1 times between Level 0 and Level L−2.

On line 2, $A^l$ indicates a Discrete Laplacian of each level, and Smooth($A^l, x^l, b^l$) indicates pre-smoothing.

On line 3, "r" indicates a residual. For example, in the case where the linear equation is in the form of Ax=b (here, A, x and b are matrices, and "b" will be conveniently referred to as a right term, and "Ax" a left term), a value resulted from subtracting the left term from the right term is defined as the residual, and $r^l \leftarrow b^l − A^l x^l$ indicates that the residual is obtained for each level.

On line 4, $b^{l+1} \leftarrow$ Restrict($r^l$) indicates a restriction. The residual $r^l$ is down-sampled and set as the right term of a next level.

On line 5, $r^l_{high} \leftarrow r^l$−Prolongate($b^{l+1}$) is the step of separating the high-frequency component for middle smoothing. The high-frequency component may be separated using the difference between the pre-restriction cell ($r^l$) and the post-restriction cell ($b^{l+1}$), and $r^l_{high}$ corresponds to the high-frequency component solution, which has not been considered in the conventional multi-grid method using a V cycle.

On line 7, $x^l_{high} \leftarrow 0$ initializes the value used for middle smoothing to 0.

On line 9, $A^{L−1}x^{L−1}=b^{L−1}$ indicates the operating step in the coarsest level. The conjugate gradient method or the preconditioned conjugate gradient method may be applied in the operating step.

On line 11, Smooth($A^l, x^l_{high}, r^l_{high}$) indicates middle smoothing the high-frequency component. The smoothed high-frequency component solution may be obtained through this process.

On line 14, $x^l \leftarrow x^l + x^l_{high}$+prolongate($x^{l+1}$) indicates adding $x^l_{high}$, which is a pressure resulted from the middle smoothing, to an existing approximate value in order to calculate a new pressure approximate value. $x^l$ is an intermediate solution processed through the pre-smoothing step, and $x^l_{high}$ is a high-frequency component that has not been previously considered, referring to the high-frequency component solution that is middle-smoothed. Prolongate($x^{l+1}$) refers to a coarse solution transferred to the fine level by performing prolongation of the solution of the cell of the coarse level.

On line 15, Smooth($A^l, x^l, b^l$) indicates post-smoothing. As the post-smoothing is performed by considering the high-frequency component, which has not been conventionally considered, it is possible to reach the true value faster even if a smaller number of smoothing is performed.

Figure 7:
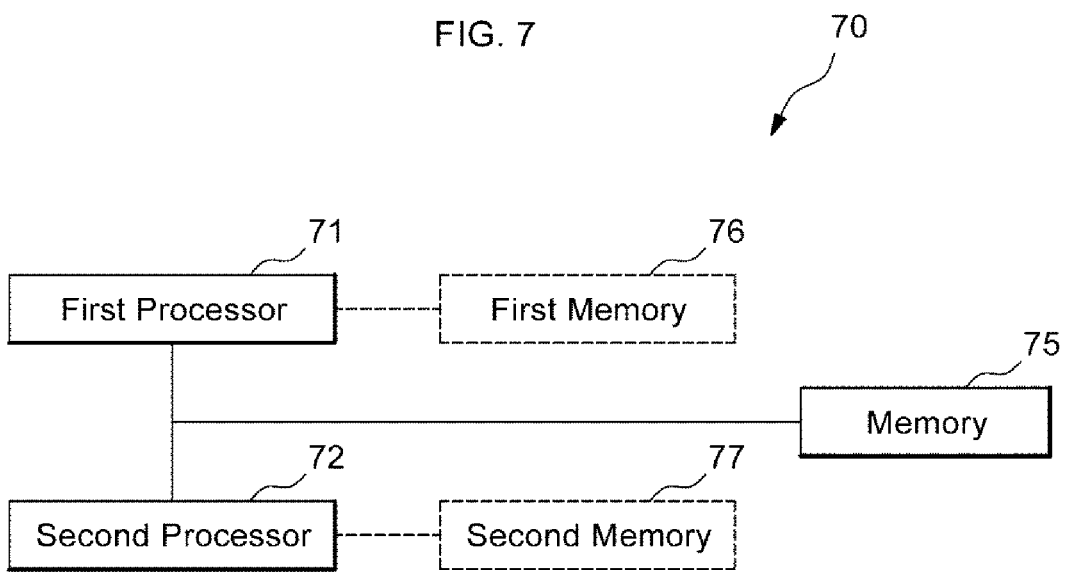
FIG. 7 is a block diagram showing a data processing apparatus in which a multi-grid method using a ∀ cycle in accordance with an embodiment of the present invention can be realized.

FIG. 7 is a block diagram showing a data processing apparatus 70 in which the multi-grid method using a ∀ cycle in accordance with an embodiment of the present invention can be realized.

The data processing apparatus 70 includes at least one or more processors. Although FIG. 7 is illustrated with an example of having two processors (a first processor 71 and a second processor 72), this is only an example, and there is no restriction on the number of processors.

The data processing apparatus 70 may further include a memory 75. Depending on the embodiment, the data processing apparatus 70 may further include a first memory 76 and a second memory 77, which may be functionally connected with the first processor 71 and the second processor 72, respectively.

The first processor 71 and the second processor 72 may realize the multi-grid method using a ∀ cycle in accordance with an embodiment of the present invention. The steps for the multi-grid method using a ∀ cycle in accordance with an embodiment of the present invention may be performed by the first processor 71 or the second processor 72, or may be delegated to the first processor 71 and the second processor 72. In an embodiment, the first processor 71 may be a CPU, and the second processor 72 may be a GPU.

The first memory 76 and the second memory 77 may be implemented inside the first processor 71 and the second processor 72, respectively, or may be implemented as dedicated memories of the first processor 71 and the second processor 72, respectively, and functionally connected with the first processor 71 and the second processor 72, respectively.

The first processor 71 and the second processor 72 may each include an ASIC (application-specific integrated circuit), another chipset, a logical circuit and/or a data processing apparatus.

The memory 75, the first memory 76 and the second memory 77 may each include ROM (read-only memory), RAM (random access memory), flash memory, memory card, storage medium and/or another storage device.

If an embodiment of the present invention is realized as software, the above-described method may be realized through a module (process, function, etc.) for performing the above-described functions. The module may be stored in any one of the memory 75, the first memory 76 and the second memory 77 and may be executed by the first processor 71 and/or the second processor 72.

The multi-grid method using a ∀ cycle in accordance with an embodiment of the present invention may be embodied in the form of program instructions, which can be performed through a data processing apparatus, and can be written in a storage medium, which can include program instructions, data files, data structures and the combination thereof.

The program instructions stored in the storage medium can be designed and configured specifically for the present invention or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of the present invention, and the opposite is also possible.

Table 3 is a summary of a result tested by the multi-grid method using a ∀ cycle in accordance with an embodiment of the present invention.

TABLE 3

| Resolution | # of Pre-/Post-smoothing | # of Middle Smoothing | Vortex Particle | Residual (V-cycle) | Residual (∀-cycle) | Residual Reduction (%) |
|---|---|---|---|---|---|---|
| $128^3$ | 0 | 8 | X | 18.040 | 8.555 | 52.593 |
| $256^3$ | 0 | 8 | X | 32.610 | 27.082 | 16.952 |
| $512^3$ | 0 | 9 | X | 108.362 | 90.111 | 16.843 |
| $128^3$ | 0 | 8 | O | 20.452 | 8.283 | 59.500 |
| $256^3$ | 0 | 8 | O | 36.672 | 20.401 | 44.369 |
| $512^3$ | 0 | 9 | O | 115.043 | 90.413 | 21.409 |
| $128^3$ | 1 | 8 | X | 8.567 | 6.645 | 22.435 |
| $256^3$ | 1 | 8 | X | 21.125 | 18.858 | 10.731 |
| $512^3$ | 1 | 9 | X | 67.931 | 63.297 | 6.822 |
| $128^3$ | 1 | 8 | O | 8.730 | 6.055 | 30.641 |
| $256^3$ | 1 | 8 | O | 21.418 | 18.687 | 12.751 |
| $512^3$ | 1 | 9 | O | 68.054 | 63.247 | 7.064 |
| $128^3$ | 2 | 8 | X | 4.288 | 3.257 | 24.044 |
| $256^3$ | 2 | 8 | X | 10.964 | 10.376 | 5.363 |
| $512^3$ | 2 | 9 | X | 36.890 | 35.758 | 3.069 |
| $128^3$ | 2 | 8 | O | 4.325 | 3.265 | 24.509 |
| $256^3$ | 2 | 8 | O | 10.990 | 10.255 | 6.688 |
| $512^3$ | 2 | 9 | O | 36.916 | 35.739 | 3.188 |

In Table 3, Residual indicates a difference between a final value to be obtained for each cell of the grid and a value obtained up to the current step.

In Table 3, when the resolution is $128^3$, the residual is 20.452 in the conventional V cycle when the middle smoothing is 8, but it can be seen that the residual is reduced by 59.5% to 8.283 when the ∀ cycle in accordance with an embodiment of the present invention is applied. Accordingly, it can be seen that the accuracy of a unit cycle is improved, and the time required to reach a specific accuracy is reduced, when the multi-grid method using a ∀ cycle in accordance with an embodiment of the present invention is applied.

The above-described embodiment includes various aspects of examples. While it is not possible to describe every possible combination of these various aspects, anyone of ordinary skill in the art to which the present invention pertains shall appreciate that other combinations than what has been described herein are possible. Therefore, it shall be appreciated that the present invention includes all other substitutions, modifications and permutations that belong to the claims appended below.

What is claimed is:

1. A method for rendering of a fluid, comprising:
   performing a multi-grid method using a V cycle comprising:
   a pre-smoothing step for obtaining a first intermediate solution and a first residual by smoothing a cell of a fine level;
   a restriction step for obtaining a cell of a coarse level by down-sampling the cell of the fine level and setting the first residual as a second residual of the cell of the coarse level;
   a middle smoothing step for obtaining a high-frequency component solution of the cell of the fine level and obtaining a smoothed high-frequency component solution by smoothing the high-frequency component solution;
   an operating step for obtaining a coarse solution in the cell of the coarse level;
   a prolongation step for up-sampling and transferring the coarse solution to the cell of the fine level and obtaining a corrected intermediate solution by adding the first intermediate solution, the smoothed high-frequency component solution and the coarse solution; and
   a post-smoothing step for obtaining a second intermediate solution by smoothing the corrected intermediate solution; and
   simulating a movement of the fluid rendering based on said multi-grid method.

2. The method of claim 1, wherein the pre-smoothing step, the middle smoothing step, the post-smoothing step have a Jacobi smoothing method or a Gauss-Sidel smoothing method applied thereto.

3. The method of claim 1, wherein the pre-smoothing step, the restriction step, the middle smoothing step, the prolongation step and the post-smoothing step are performed by a first processor, and the operating step is performed by a second processor.

4. The method of claim 3, wherein the middle smoothing step and the operating step are performed simultaneously.

5. The method of claim 1, wherein the restriction step comprises:
   determining whether a cell targeted for restriction is a solid object cell; and
   if the cell targeted for restriction is a solid object cell, setting the cell targeted for restriction with an average value of fluid cells surrounding the cell targeted for restriction.

6. The method of claim 5, wherein the prolongation step comprises:
   determining whether a cell targeted for prolongation is a solid object cell; and
   if the cell targeted for prolongation is a solid object cell, setting the cell targeted for prolongation with an average value of fluid cells surrounding the cell targeted for prolongation.

7. A computer system comprising one or more non-transitory computer-readable memories which store, in combination or singularly, instructions that, when executed by one or more computers, cause the one or more computers to perform operations for rendering a fluid, said operations comprising:
   performing a multi-grid method using a V cycle comprising:
   a pre-smoothing step for obtaining a first intermediate solution and a first residual by smoothing a cell of a fine level;
   a restriction step for obtaining a cell of a coarse level by down-sampling the cell of the fine level and setting the first residual as a second residual of the cell of the coarse level;
   a middle smoothing step for obtaining a high-frequency component solution of the cell of the fine level and obtaining a smoothed high-frequency component solution by smoothing the high-frequency component solution;

an operating step for obtaining a coarse solution in the cell of the coarse level;

a prolongation step for up-sampling and transferring the coarse solution to the cell of the fine level and obtaining a corrected intermediate solution by adding the first intermediate solution, the smoothed high-frequency component solution and the coarse solution; and a post-smoothing step for obtaining a second intermediate solution by smoothing the corrected intermediate solution; and simulating a movement of the fluid rendering based on said multi-grid method.

8. A data processing apparatus comprising at least one processor configured to render a fluid, the at least one processor configured to:

perform a multi-grid method using a V cycle comprising:

a pre-smoothing step for obtaining a first intermediate solution and a first residual by smoothing a cell of a fine level;

a restriction step for obtaining a cell of a coarse level by down-sampling the cell of the fine level and setting the first residual as a second residual of the cell of the coarse level;

a middle smoothing step for obtaining a high-frequency component solution of the cell of the fine level and obtaining a smoothed high-frequency component solution by smoothing the high-frequency component solution;

an operating step for obtaining a coarse solution in the cell of the coarse level;

a prolongation step for up-sampling and transferring the coarse solution to the cell of the fine level and obtaining a corrected intermediate solution by adding the first intermediate solution, the smoothed high-frequency component solution and the coarse solution; and a post-smoothing step for obtaining a second intermediate solution by smoothing the corrected intermediate solution; and simulate a movement of the fluid rendering based on said multi-grid method.

9. The data processing apparatus of claim 8, wherein the at least one processor comprises:

a first processor configured to perform the pre-smoothing step, the restriction step, the middle smoothing step, the prolongation step and the post-smoothing step; and a second processor configured to perform the operating step.

10. The data processing apparatus of claim 9, wherein the first processor is a CPU (central processing unit) and the second processor is a GPU (graphics processing unit).

11. The data processing apparatus of claim 10, wherein the middle smoothing step and the operating step are performed simultaneously.

12. The data processing apparatus of claim 8, wherein the pre-smoothing step, the middle smoothing step, the post-smoothing step have a Jacobi smoothing method or a Gauss-Sidel smoothing method applied thereto.

13. The data processing apparatus of claim 8, wherein the restriction step comprises:

determining whether a cell targeted for restriction is a solid object cell; and if the cell targeted for restriction is a solid object cell, setting the cell targeted for restriction with an average value of fluid cells surrounding the cell targeted for restriction.

14. The data processing apparatus of claim 13, wherein the prolongation step comprises:

determining whether a cell targeted for prolongation is a solid object cell; and if the cell targeted for prolongation is a solid object cell, setting the cell targeted for prolongation with an average value of fluid cells surrounding the cell targeted for prolongation.

* * * * *